(12) United States Patent
Lindsay

(10) Patent No.: US 7,717,726 B2
(45) Date of Patent: May 18, 2010

(54) SELF-ALIGNING ELECTRICAL CONTACT AND RELATED METHODS

(75) Inventor: Derek Lindsay, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 343 days.

(21) Appl. No.: 11/872,204

(22) Filed: Oct. 15, 2007

(65) Prior Publication Data
US 2009/0124105 A1 May 14, 2009

(51) Int. Cl.
*A47C 7/72* (2006.01)
*H01R 13/28* (2006.01)

(52) U.S. Cl. ............ 439/289; 439/364; 297/217.3

(58) Field of Classification Search .......... 439/289, 439/660, 364, 680
See application file for complete search history.

(56) References Cited

U.S. PATENT DOCUMENTS

| | | | | |
|---|---|---|---|---|
| 810,244 | A * | 1/1906 | Wright | 439/6 |
| 1,902,791 | A * | 3/1933 | Taylor | 439/824 |
| 2,563,712 | A * | 8/1951 | Frei et al. | 439/279 |
| 2,742,626 | A * | 4/1956 | Collins et al. | 439/363 |
| 3,668,608 | A * | 6/1972 | Ziegler, Jr. | 439/248 |
| 4,025,964 | A * | 5/1977 | Owens | 623/11.11 |
| 4,495,917 | A * | 1/1985 | Byers | 607/57 |
| 4,778,404 | A * | 10/1988 | Pass | 439/387 |
| 4,957,449 | A * | 9/1990 | Hatagishi | 439/364 |
| 5,007,858 | A * | 4/1991 | Daly et al. | 439/498 |
| 5,529,509 | A | 6/1996 | Hayes et al. | |
| 5,752,845 | A | 5/1998 | Fu | |
| 6,042,431 | A | 3/2000 | Hayakawa | |
| 6,050,835 | A | 4/2000 | Henrion et al. | |
| 6,250,703 | B1 | 6/2001 | Cisler et al. | |
| 6,279,981 | B1 * | 8/2001 | Mesnage | 296/65.03 |
| 6,379,191 | B1 * | 4/2002 | Goetz et al. | 439/660 |
| 6,485,080 | B2 | 11/2002 | Hansen et al. | |
| 6,652,304 | B1 | 11/2003 | Chalons et al. | |
| 6,726,498 | B2 * | 4/2004 | Pogliani | 439/272 |
| 6,752,445 | B1 | 6/2004 | Koehler et al. | |
| 2009/0001775 | A1 * | 1/2009 | Smith | 297/135 |

* cited by examiner

*Primary Examiner*—Neil Abrams
(74) *Attorney, Agent, or Firm*—Mark E. Duell, Esq.; Emerson, Thomson & Bennett

(57) ABSTRACT

The present invention generally relates to self-aligning electrical coupling devices and related methods. For example, one embodiment can include an aligning means for aligning a central axis of a male connector component with a central axis of a female connector component. The embodiment can also include a rotationally-aligning means for rotationally aligning a male connector component with a female connector component so as to achieve a predetermined rotational orientation. Some embodiments can also an electrically-communicating means for electrically communicating between the male connector component and the female connector component. Some embodiments relate to processes for assembling self-aligning electrical coupling device.

20 Claims, 3 Drawing Sheets

SELF-ALIGNING ELECTRICAL CONTACT AND RELATED METHODS

I. BACKGROUND OF THE INVENTION

A. Field of Invention

This invention relates to self-aligning electrical contacts and related methods.

B. Description of the Related Art

Electrical coupler devices comprising male and female components are known in the art. However, prior couplers have required careful alignment of the male and female components. For example, in one prior coupler a male component is affixed to a vehicle seat, a female component is affixed to a vehicle floor, and an assembler must manually guide the male component into the female component in order to form the electrical contact. In other embodiments, the male and female components are mated after the seat is installed, which again requires manual alignment, and requires an extra step in addition to installing the seat.

The present invention provides a coupling device that differs from the prior art. Some embodiments enable self-aligning male/female electrical connections. Furthermore, some embodiments include processes related to such electrical connections.

II. SUMMARY OF THE INVENTION

Some embodiments of the present invention relate to an electrical coupler, comprising: a male component having a mating face and a non-mating face spaced apart from the mating face; at least one male terminal disposed in the mating face of the male component, and extending outward from the mating face; at least one wall disposed through the male component and defining a through-hole passing through the body of the male component from the mating face to the non-mating face; a female component having a mating face and a non-mating face spaced apart from the mating face; at least one female terminal disposed in the mating face of the female component for receiving the at least one male terminal in an electrically communicative relation; and at least one wall disposed through the female component and defining a through-hole passing through the body of the female component from the mating face to the non-mating face, and the through-hole being in a position that enables simultaneous alignment of the male and female terminals and the through-holes of the male and female components.

Other embodiments relate to a process for connecting, comprising the steps of: partially engaging a male-beveled connector with a female beveled connector, such that at least a portion of the male-beveled surface is in contact with at least a portion of the female-beveled surface; adjusting the relative position of the male and female connectors until the male and female terminals are aligned; and contacting a male electrical contact disposed on the male connector with a mateable female contact disposed on the female connector such that the male contact is in electrical communication with the female contact.

Still other embodiments relate to an electrical connection, comprising: an aligning means for aligning a central axis of a male connector component with a central axis of a female connector component; a rotationally-aligning means for rotationally aligning a male connector component with a female connector component so as to achieve a predetermined rotational orientation; a fastener-accepting means for accepting a fastener through a mated pair of male and female connectors; and an electrically-communicating means for electrically communicating between the male connector component and the female connector component.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
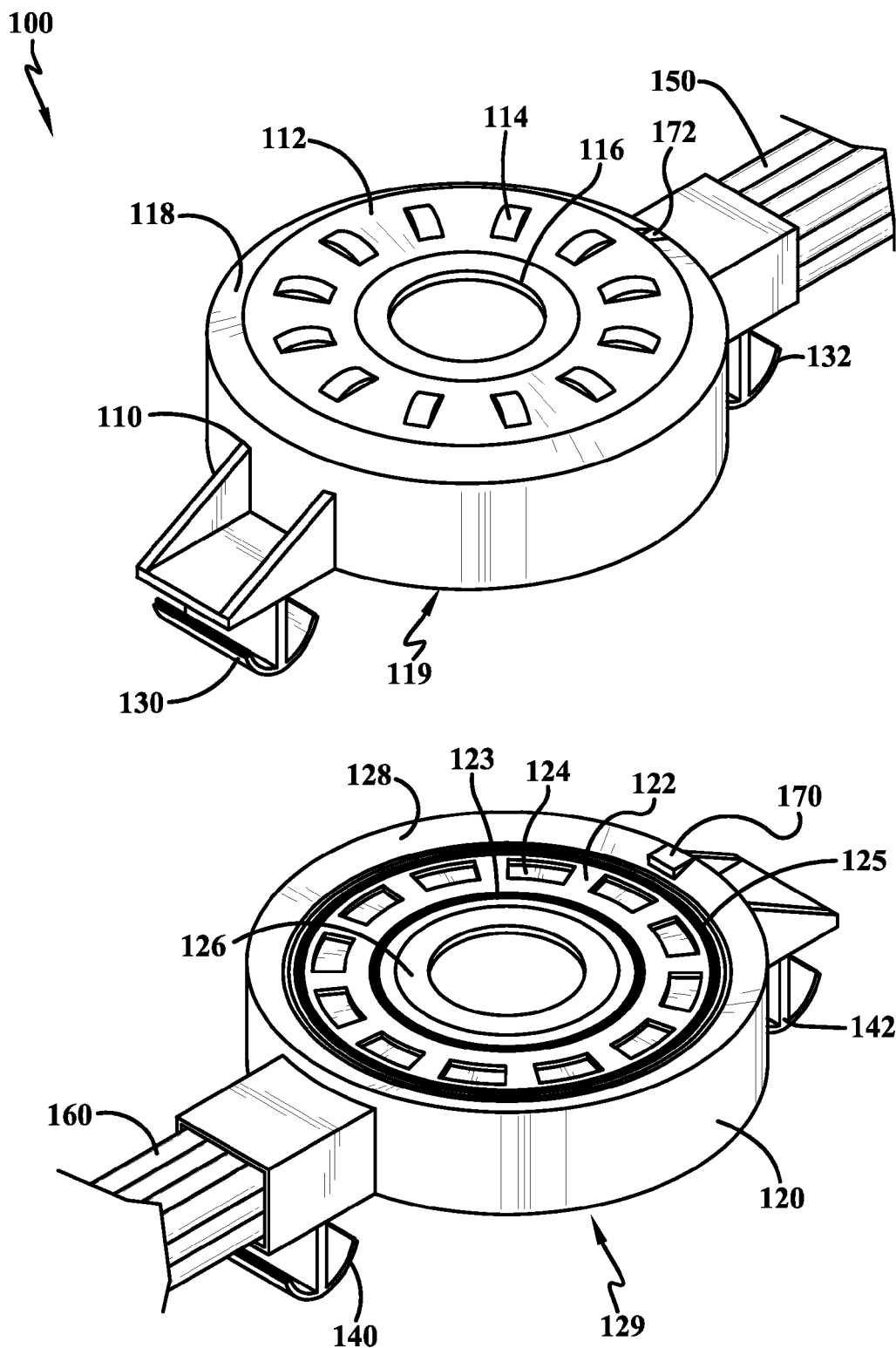
FIG. 1 is a drawing of an embodiment having a male component and a female component.

The present invention generally relates to self-aligning electrical contacts and related methods. Some embodiments include mateable male and female electrical components. According to some embodiments, the male and female electrical components each comprise a mating face and a non-mating face. Furthermore, the male and female electrical components can each include at least one mateable alignment means, which requires the male and female components to mate in a predetermined orientation. Optionally, in some embodiments the one or more alignment means can include a rotational alignment means, which requires the male and female components to mate in a predetermined rotational orientation. In some embodiments, the male and female components can be fastened together using any of a variety of fasteners.

According to one embodiment, a male electrical component comprises a mating face and a non-mating face spaced apart from the mating face and defining a thickness. The mating face of the male component can include one or more male electrical contacts. The mating face can also include at least one beveled edge. According to one embodiment the beveled surface slants downward relative to an upward-facing male mating face, but in another embodiment the beveled surface can slant upward relative to an upward-facing male mating face. Optionally, some embodiments can also include one or more rotational alignment means for orienting the mating faces of the male and female components according to a pre-determined rotational orientation.

The male component body can comprise any of a variety of shapes. Some shapes that are within the scope of the present invention include circles, ellipses, triangles, rectangles and polygons. Furthermore, the male component body can comprise any of a variety of materials. Some materials can include, without limitation, one or more organic polymers such as polyethylene, polypropylene, an elastomer, vulcanized rubber, and the like or any combination thereof.

The male mating face can comprise any of a wide variety of shapes, and can have a shape different from that of the male component body. Some shapes within the scope of the present invention include a rounded shape such as a circle, or an ellipse. In other embodiments, the male mating face can comprise a triangle, a rectangle, or a polygon. Furthermore, in some embodiments the male component body can comprise a circle, while the male mating face comprises the same shape or a different shape, such as a polygon. In some embodiments, the male mating face can include one or more seals. For instance, a male mating face can include two o-ring seals radially spaced apart and defining a sealable region. In such embodiments, the o-rings are mateable with a surface of the female component, such as the female mating face. In the mated state, the o-ring seals can function to exclude moisture from the sealable region. In a related embodiment, the male mating face can comprise one seal, while the female mating face comprises a second seal and together the first and second seals define a sealable region.

In embodiments having a beveled surface, the beveled surface can comprise any of a variety of shapes, or combinations of shapes. In general, the beveled surface comprises an intermediate region between the male mating face and the other surfaces of the male component. As noted previously, in some embodiments, the body of the male component can have a shape that is similar to that of the male mating face. For instance, both the male component body and the male mating face can comprise a circular shape. In such embodiments, the beveled surface can comprise a portion of a circular cone. However, in other embodiments, the male component body can have a different shape from that of the male mating face. For instance, the male component body can have a square shape while the male mating face has a circular shape. In such embodiments, the beveled surface can have a complex geometry comprising a square shape where the bevel meets the body, and progressing gradually to a more circular shape until becoming circular at the male mating face.

The width of a beveled surface can vary widely from one embodiment to another. In one embodiment the width can be between about 0.1 millimeter and 10 centimeters. In other embodiments, the width can be between about 0.1 millimeter and 1 millimeter, about 1 millimeter and 2 millimeters, about 2 millimeters and 3 millimeters, about 3 millimeters and 4 millimeters, about 4 millimeters and 5 millimeters, about 5 millimeters and 6 millimeters, about 6 millimeters and 7 millimeters, about 7 millimeters and 8 millimeters, about 8 millimeters and 9 millimeters, about 9 millimeters and 1 centimeter, about 1 centimeter and 2 centimeters, about 2 centimeters and 3 centimeters, about 3 centimeters and 4 centimeters, about 4 centimeters and 5 centimeters, about 5 centimeters and 6 centimeters, about 6 centimeters and 7 centimeters, about 7 centimeters and 8 centimeters, about 8 centimeters and 9 centimeters, or about 9 centimeters and 10 centimeters. Here, as elsewhere in the specification and claims, ranges may be combined.

The angle at which the beveled surface approaches the male mating face can vary widely from one embodiment to another. In some embodiments, the angle at which the beveled surface approaches the male mating face can be from greater than about 0 degrees and less than about 90 degrees. Furthermore, in some embodiments the angle can be from greater than 0 degrees to about 10 degrees, from about 10 to 20 degrees, from about 20 to 30 degrees, from about 30 to 40 degrees, from about 40 to 50 degrees, from about 50 to 60 degrees, from about 60 to 70 degrees, from about 70 to 80 degrees, or from about 80 to less than about 90 degrees.

In some embodiments the at least one male contact can comprise a plurality of male contacts spaced apart according to a predetermined pattern. For example, in some embodiments the male contacts can comprise a rounded pattern such as a circle or an ellipse. In other embodiments, the pattern can comprise a triangle, a rectangle, or a polygon. The pattern of the contacts can be similar to the shape of the male mating surface. However, this is not required. Accordingly, a circular male mating face can comprise a plurality of male contacts having a circular, triangular or polygonal pattern. One of skill in the art will appreciate that the specific number of male contacts will be determined according to the specific application. Accordingly, a variety of numbers of male contacts are within the scope of the present invention.

In some embodiments one or more of the male contacts can be spring-loaded. For example, in an unmated state a male contact can be above the level of the male mating surface, and may elastically compress during mating. In one embodiment, a male contact can comprise a ribbon structure. For example, a suitable ribbon structure can comprise a rectangle, and can define a two-dimensionally curved surface such as an arched, parabolic, or hyperbolic surface. In other embodiments, a male contact can comprise a three-dimensionally curved structure such as at least a portion of a sphere, ellipsoid, paraboloid, or hyperboloid. Additionally, in some embodiments a male contact can comprise a telescopic structure or a retractable structure that can be compressed and/or folded during mating. In some embodiments this can include compression to a level at or below the male mating surface. One of skill in the art will recognize that a variety of similar structures are capable of performing the same function, and are therefore within the scope of the present invention.

The at least one male contact can comprise any of a variety of conductive materials. Some conductive materials include, without limitation, metals or alloys. Some metals can include, without limitation, gold, copper, aluminum, steel or any combination thereof.

In some embodiments, the male component can include at least one wall defining at least one through-hole. In embodiments having one through-hole the wall can be centrally located, and can extend from the male mating face to the non-mating face. In such embodiments, the wall can define and surround a longitudinal axis. The longitudinal axis can be approximately perpendicular to the male mating and non-mating faces. However, other angles are also acceptable. Some embodiments can also include a collar disposed within the through-hole. Suitable collars can comprise any of a variety of materials including, without limitation, a metal, an alloy, a ceramic, an organic polymer, a fiberglass composition, a graphite composition, a ferrite composition, or a steel composition.

According to one embodiment, a female electrical component comprises a mating face and a non-mating face spaced apart from the mating face and defining a thickness. The mating face of the female component can include one or more female electrical contacts. The female mating face can also include at least one beveled edge. According to one embodiment the beveled surface can slant upward relative to an upward-facing female mating face, but in another embodiment the beveled face slants downward relative to an upward-facing female mating face. Optionally, some embodiments can also include one or more rotational alignment means for orienting the mating faces of the male and female components according to a pre-determined rotational orientation.

The female component body can comprise any of a variety of shapes. Some shapes that are within the scope of the present invention include circles, ellipses, triangles, rectangles and polygons. Furthermore, the female component body can comprise any of a variety of materials. Some materials can include, without limitation, one or more organic polymers such as polyethylene, polypropylene, an elastomer, vulcanized rubber, and the like or any combination thereof.

The female mating face can comprise any of a wide variety of shapes, and can have a shape that is different from that of the female component body. Some shapes within the scope of the present invention include a rounded shape such as a circle, or an ellipse. In other embodiments, the female mating face can comprise a triangle, a rectangle, or a polygon. Furthermore, in some embodiments the female component body can comprise a circle, while the female mating face comprises the same shape or a different shape, such as a polygon. In some embodiments, the female mating face can include one or more seals. For instance, a female mating face can include two o-ring seals radially spaced apart and defining a sealable region. In such embodiments, the o-rings are mateable with a surface of the male component, such as the male mating face. In the mated state, the o-ring seals can function to exclude moisture from the sealable region. In a related embodiment, the male mating face can comprise one seal, while the female mating face comprises a second seal and together the first and second seals define a sealable region.

In embodiments having a beveled surface, the beveled surface can comprise any of a variety of shapes, or combinations of shapes. In general, the beveled surface comprises an intermediate region between the female mating face and the other surfaces of the female component. As noted previously, in some embodiments, the female component body can have a shape that is similar to that of the female mating face. For instance, both the female component body and the female mating face can comprise a circular shape. In such embodiments, the beveled surface can comprise a portion of a circular cone. However, in other embodiments, the female component body can have a different shape from that of the female mating face. For instance, the female component body can have a square shape while the female mating face has a circular shape. In such embodiments, the beveled surface can have a complex geometry comprising a square shape where the bevel meets the body, and progressing gradually to a more circular shape until becoming circular at the female mating face.

The width of a beveled surface can vary widely from one embodiment to another. In one embodiment the width can be between about 0.1 millimeter and 10 centimeters. In other embodiments, the width can be between about 0.1 millimeter and 1 millimeter, about 1 millimeter and 2 millimeters, about 2 millimeters and 3 millimeters, about 3 millimeters and 4 millimeters, about 4 millimeters and 5 millimeters, about 5 millimeters and 6 millimeters, about 6 millimeters and 7 millimeters, about 7 millimeters and 8 millimeters, about 8 millimeters and 9 millimeters, about 9 millimeters and 1 centimeter, about 1 centimeter and 2 centimeters, about 2 centimeters and 3 centimeters, about 3 centimeters and 4 centimeters, about 4 centimeters and 5 centimeters, about 5 centimeters and 6 centimeters, about 6 centimeters and 7 centimeters, about 7 centimeters and 8 centimeters, about 8 centimeters and 9 centimeters, or about 9 centimeters and 10 centimeters.

The angle at which the beveled surface approaches the female mating face can vary widely from one embodiment to another. In some embodiments, the angle at which the beveled surface approaches the female mating face can be from greater than about 0 degrees and less than about 90 degrees. Furthermore, in some embodiments the angle can be from greater than about 0 degrees to about 10 degrees, from about 10 to 20 degrees, from about 20 to 30 degrees, from about 30 to 40 degrees, from about 40 to 50 degrees, from about 50 to 60 degrees, from about 60 to 70 degrees, from about 70 to 80 degrees, or from about 80 to less than about 90 degrees.

In some embodiments the at least one female contact can comprise a plurality of female contacts spaced apart according to a predetermined pattern. For example, in some embodiments the female contacts can comprise a rounded pattern such as a circle or an ellipse. In other embodiments, the pattern can comprise a triangle, a rectangle, or a polygon. The pattern of the contacts can be similar to the shape of the female mating face. However, this is not required. Accordingly, a circular female mating face can comprise a plurality of female contacts having a circular, triangular or polygonal pattern. One of skill in the art will appreciate that the specific number of female contacts will be determined according to the specific application. Accordingly, a variety of numbers of female contacts are within the scope of the present invention.

The at least one female contact can comprise any of a variety of conductive materials. Some conductive materials include, without limitation, metals or alloys. Some metals can include, without limitation, gold, copper, aluminum, steel or any combination thereof. Furthermore, a female contact can comprise a material that is the same or different from that of a male contact.

In some embodiments, the female component can include at least one wall defining at least one through-hole. In embodiments having one through-hole the wall can be centrally located, and can extend from the female mating face to the non-mating face. In such embodiments, the wall can define and surround a longitudinal axis. The longitudinal axis can be approximately perpendicular to the female mating and non-mating faces. However, other angles are also acceptable. Some embodiments can also include a collar disposed within the through-hole. Suitable collars can comprise any of a variety of materials including, without limitation, a metal, an alloy, a ceramic, an organic polymer, a fiberglass composition, a graphite composition, a ferrite composition, or a steel composition.

Some embodiments include one or more means for aligning the female mating face with the male mating face. In some embodiments, such a means can include an alignment key and seat structures. For example, the one component can include a recessed seat structure adapted to receive an alignment key disposed on the other component. In one embodiment, the alignment key can comprise a raised structure disposed on the beveled surface of the male component. Thus, in order for the male component to mate with the female component the alignment key of the male component must be received by the recess of the female component. In embodiments where the male and female components comprise a circular body shape, an alignment key can force the components to mate in a predetermined rotational orientation.

Referring now to the drawings wherein the showings are for purposes of illustrating embodiments of the invention only and not for purposes of limiting the same, FIG. 1 is a drawing of an embodiment 100 comprising a mateable pair of male and female components. The male component 119 has a generally circular body 110, and a similarly circular male mating face 112. Accordingly, the beveled surface 118 defines a section of a circular cone. In this embodiment, the male bevel 118 slants downward relative to an upward-facing mating face 112. According to this particular embodiment, a portion of male bevel 118 includes a female alignment seat 172 adapted to accept a male alignment key. The male component 119 also includes a plurality of male contacts 114. According to this embodiment, each of the male contacts 114 comprises a rectangular metal band that is bent so as to define a curved surface. The curved rectangular bands comprise springs. Thus, the male contacts of this embodiment are spring-loaded. The male component 119 also includes a centrally located cylindrical wall defining a through-hole, and the wall is fitted with a steel collar 116. The male component 119 also includes a pair of mounting clips 130 and 132, which can be used to affix the male component 119 to device or bulkhead. Finally, according to this drawing the male component 119 also includes a power cable 150 in electrical communication with the plurality of male contacts 114.

The female component 129 has a generally circular body 120, and similarly circular female mating face 122. Accordingly, the beveled surface 128 defines a section of a circular cone. In this embodiment, the female bevel 128 slants downward relative to an upward-facing female mating face 122. According to this particular embodiment, a portion of female bevel 128 includes a male alignment key 170 adapted to mate with the female alignment seat 172. The female mating face 122 includes two o-ring seals 123 and 125, which mate against the male mating surface 112 and form a moisture-resistant seal. The female component 129 also includes a plurality of female contacts 124. According to this embodiment, each of the female contacts 124 comprises a metal band having a generally flat contact face. The female component 129 also includes a centrally located circular wall defining a through-hole, and the wall is fitted with a steel collar 126. The female component 129 also includes a pair of mounting clips 140 and 142, which can be used to affix the female component 129 to device or bulkhead. Finally, according to this drawing the female component 129 also includes a power cable 160 in electrical communication with the plurality of female contacts 124.

Figure 2:
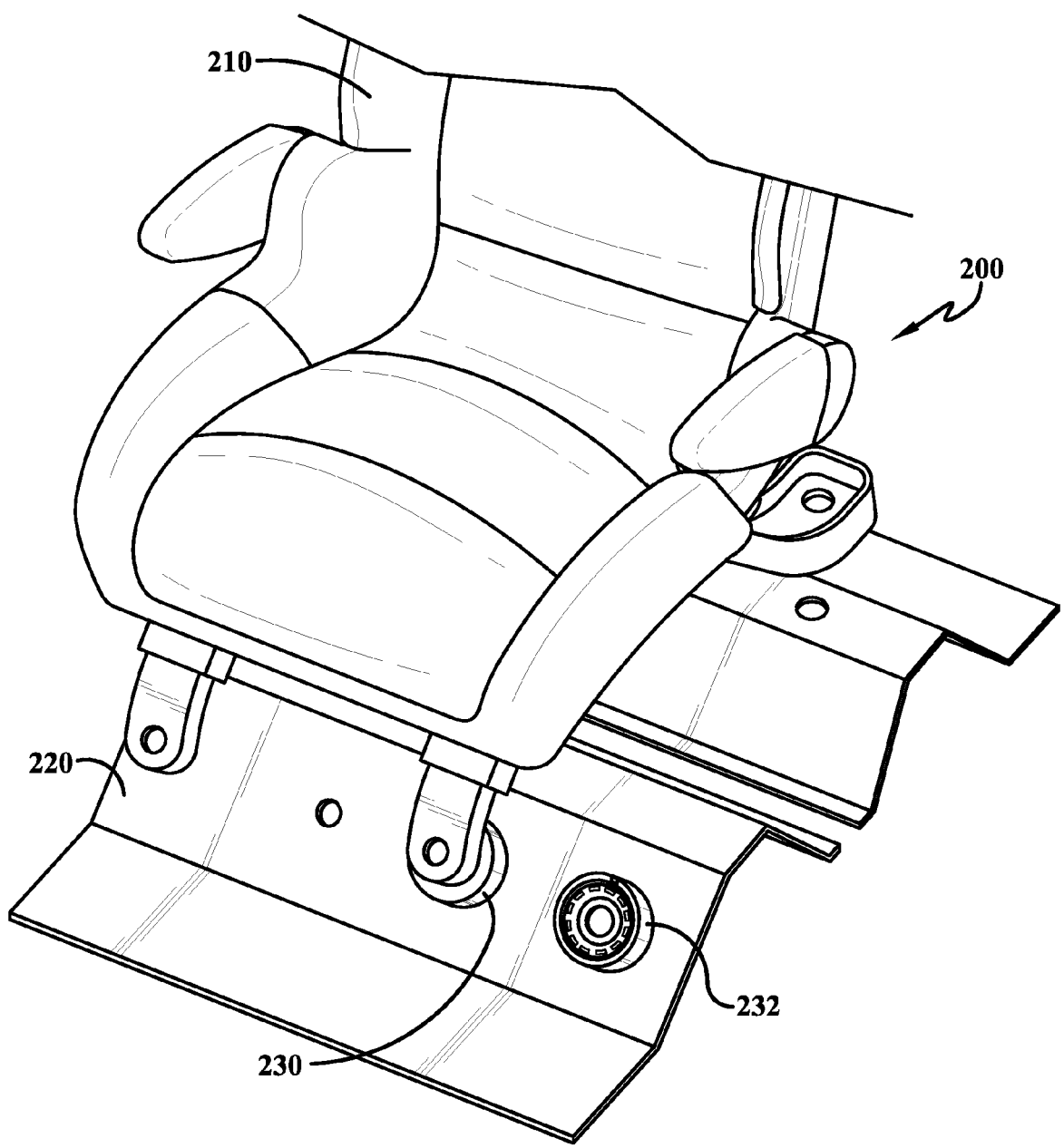
FIG. 2 is a drawing showing one way in which the embodiment of FIG. 1 could be installed in a vehicle.

FIG. 2 is a drawing that shows how an embodiment 200 such as that of FIG. 1 can be installed in a vehicle. According to this drawing, a male component 230 is affixed to a foot of a vehicle seat 210, and a mating female component 232 is affixed to a floor 220 of the vehicle. Accordingly, the components 230 and 232 mate as the seat 210 is installed in the vehicle. A bolt hole is shown to pass through the center of the male and female components 230 and 232. Thus, a bolt can be installed therethrough to affix the seat 210 to the vehicle floor 220.

Figure 3:
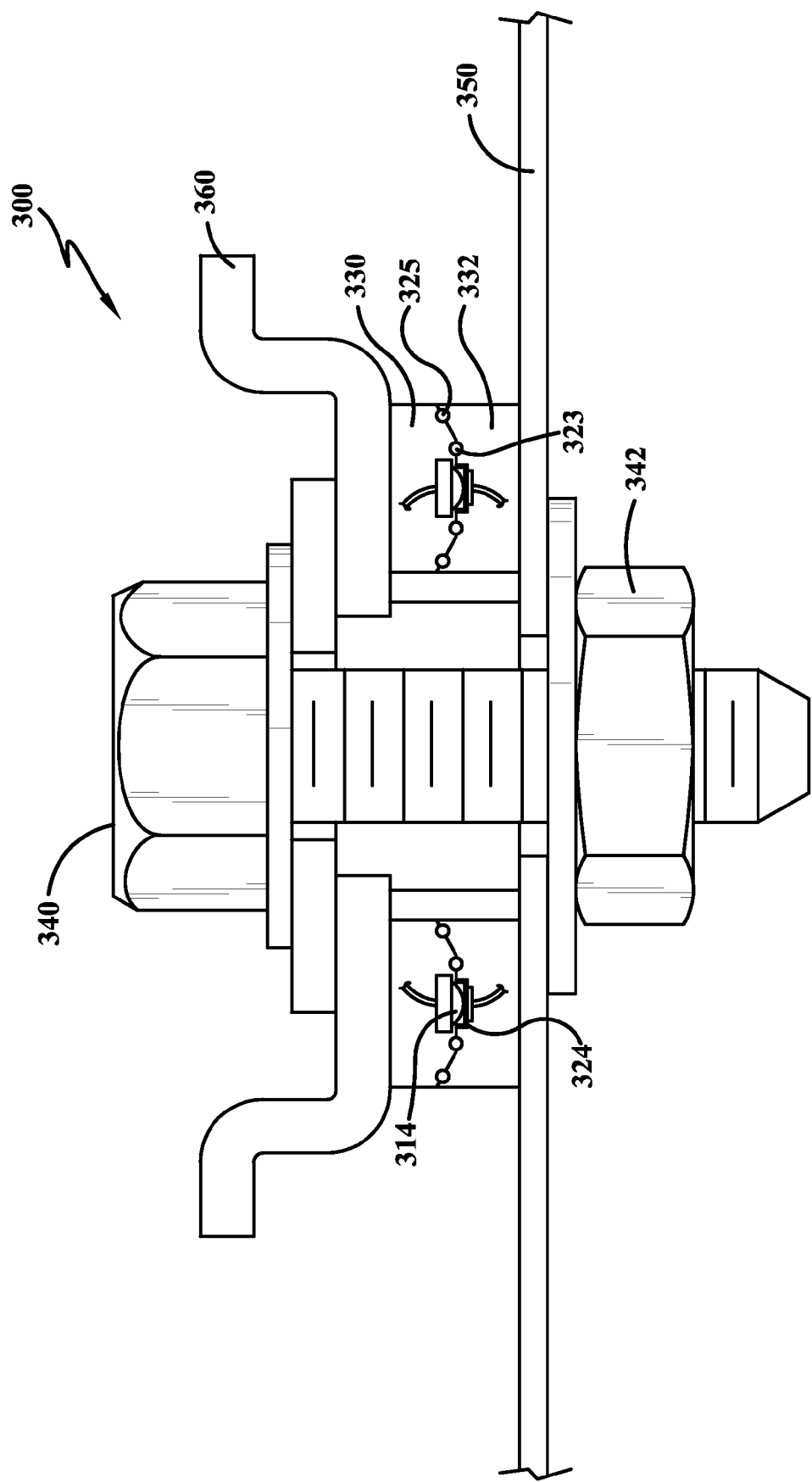
FIG. 3 is a cut-away view of the embodiment of FIG. 1.

FIG. 3 shows a cut-away view of a mated pair of male and female components installed in a vehicle. As shown, a male component 330 is affixed to a foot 360 of a vehicle seat, and a female component 332 is affixed to a floor 350 of the vehicle. The male 330 and female 332 components are mated together and fastened with a bolt 340 and nut 342. As shown, a male contact 314 of the male component 330 is in electrical communication with a female contact 324 of the female component 332. Additionally, the male and female contacts 314 and 324 are disposed between a pair of o-ring seals 323 and 325.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

Having thus described the invention, it is now claimed:

I claim:

1. An apparatus comprising:
   a first electrical connector comprising:
      a mating face and a non-mating face spaced apart from the mating face;
      at least one electrical terminal disposed in the mating face of the first electrical connector;
      a wall defining an aperture passing through the first electrical connector from the mating face to the non-mating face;
      wherein the first electrical connector is operatively attached to a support structure;
   a second electrical connector comprising:
      a mating face and a non-mating face spaced apart from the mating face;
      at least one electrical terminal disposed in the mating face of the second electrical connector for contacting the at least one electrical terminal of the first electrical connector in electrical communication;
      a wall defining an aperture passing through the second electrical connector from the mating face to the non-mating face;
      wherein the second electrical connector is operatively attached to a first foot of a seat having a seat portion for receiving an associated person, and wherein the first foot has an aperture for receiving a fastener;
   wherein the fastener passes through the aperture in the first foot, the aperture in the first electrical connector, and the aperture in the second electrical connector to attach the seat to the support structure;
   wherein the mating face of the first electrical connector aligns with the mating face of the second electrical connector, and wherein the at least one electrical terminal of the first electrical connector is in electrical communication with the at least one electrical terminal of the second electrical connector when the seat is attached to the support structure.

2. The apparatus of claim 1, wherein the support structure is a vehicle floor and the seat is a vehicle seat.

3. The apparatus of claim 1 wherein the at least one electrical terminal of the first electrical connector is a male terminal extending outward from the mating face of the first electrical connector, and wherein the at least one electrical terminal of the second electrical connector is a female terminal which receives the at least one male terminal in electrical communication.

4. The apparatus of claim 3, wherein the at least one male terminal is spring-loaded.

5. The apparatus of claim 1, wherein the mating face of the first electrical connector includes a beveled perimeter.

6. The apparatus of claim 5, wherein the mating face of the second electrical connector includes a beveled perimeter for receiving the beveled perimeter of the mating face of the first electrical connector.

7. The apparatus of claim 1, wherein the at least one wall of one or more of the first electrical connector and the second electrical connector includes a collar formed of a material selected from the group consisting of a metal, an alloy, a ceramic, an organic polymer, a fiberglass composition, a graphite composition, a ferrite composition, and a steel composition.

8. The apparatus of claim 7, wherein the collar is formed of steel.

9. The apparatus of claim 1 further comprising:
   an alignment key disposed on one of the first electrical connector and the second electrical connector;
   a recess disposed on the other connector;
   wherein the recess is adapted to receive the alignment key to align the mating face of the first electrical connector with the mating face of the second electrical connector.

10. The apparatus of claim 1, wherein at least one of the first electrical connector and the second electrical connector include an outer perimeter having a shape selected from the group consisting of a circle, an oval, a triangle, a rectangle, a pentagon, a hexagon, a heptagon, and an octagon.

11. The apparatus of claim 1 further comprising:
   a pair of seals located between the mating face of the first electrical connector and the mating face of the second electrical connector when the seat is attached to the support structure, wherein the pair of seals are radially spaced apart to define a sealable region, and wherein the pair of seals substantially exclude moisture from the sealable region.

12. The apparatus of claim 1 further comprising:
at least one mounting clip to attach the first electrical connector to the support structure.

13. The apparatus of claim 1 further comprising:
at least one mounting clip to attach the second electrical connector to the foot of the seat.

14. A method comprising the steps of:
providing a first electrical connector to a support structure, wherein the first electrical connector includes a mating face and a non-mating face spaced apart from the mating face, at least one electrical terminal disposed in the mating face of the first electrical connector, and a wall defining an aperture passing through the first electrical connector from the mating face to the non-mating face;
providing a second electrical connector to a first foot of a seat having a seat portion for receiving an associated person, wherein the second electrical connector includes a mating face and a non-mating face spaced apart from the mating face, at least one electrical terminal disposed in the mating face of the second electrical connector for contacting the at least one electrical terminal of the first electrical connector in electrical communication, and a wall defining an aperture passing through the second electrical connector from the mating face to the non-mating face;
installing the seat on a support structure, wherein the mating face of the first electrical connector aligns with the mating face of the second electrical connector, and wherein the at least one electrical terminal of the first electrical connector is in electrical communication with the at least one electrical terminal of the second electrical connector;
attaching the seat to the support structure with at least one fastener, wherein the at least one fastener passes through an aperture in the first foot, the aperture in the first electrical connector, and the aperture in the second electrical connector before connecting to the support structure.

15. The method of claim 14, wherein the support structure is a vehicle floor and the seat is a vehicle seat.

16. The method of claim 14, wherein the at least one electrical terminal of the first electrical connector is a male terminal extending outward from the mating face of the first electrical connector, and wherein the at least one electrical terminal of the second electrical connector is a female terminal which receives the at least one male terminal in electrical communication.

17. The method of claim 14, wherein the at least one wall of one or more of the first and second electrical connectors includes a collar formed of a material selected from the group consisting of a metal, an alloy, a ceramic, an organic polymer, a fiberglass composition, a graphite composition, a ferrite composition, and a steel composition.

18. The method of claim 14 wherein the step of installing the seat on a support structure includes aligning the mating faces of the first and second electrical connectors by locating an alignment key disposed on one of the first electrical connector and the second electrical connector within a recess disposed on the other connector.

19. The method of claim 14 wherein the step of installing the seat on a support structure includes forming a sealable region around the connection between the at least one electrical terminal of the first electrical connector and the at least one electrical terminal of the second electrical connector with a pair of radially spaced apart seals, wherein the pair of seals substantially exclude moisture from the sealable region.

20. The method of claim 14, wherein the step of providing a first electrical connector to a support structure includes attaching the first electrical connector to the support structure with at least one mounting clip, and wherein the step of providing a second electrical connector to a first foot includes attaching the second electrical connector to the foot with at least one mounting clip.

* * * * *